United States Patent [19]

Okada et al.

[11] Patent Number: 5,416,055
[45] Date of Patent: May 16, 1995

[54] CATALYSTS FOR EMISSION CONTROL OF ALDEHYDE

[75] Inventors: Jun Okada; Akihide Okada, both of Yokohama, Japan

[73] Assignee: Nissan Motor Co., Ltd., Yokohama, Japan

[21] Appl. No.: 92,912

[22] Filed: Jul. 19, 1993

[30] Foreign Application Priority Data

Jul. 24, 1992 [JP] Japan ................................. 4-198368

[51] Int. Cl.$^6$ .......................... B01J 21/04; B01J 21/06
[52] U.S. Cl. .................................. 502/349; 502/355; 423/239.1
[58] Field of Search .......................... 502/349, 351, 355

[56] References Cited

U.S. PATENT DOCUMENTS

| | | | |
|---|---|---|---|
| 3,928,238 | 12/1975 | Koberstein | 502/351 |
| 4,537,873 | 8/1985 | Kato et al. | 502/350 |
| 4,673,556 | 6/1987 | McCabe et al. | 423/213.5 |
| 5,010,051 | 4/1991 | Rudy | 423/213.5 |
| 5,063,192 | 11/1991 | Murakami et al. | 502/213.5 |

FOREIGN PATENT DOCUMENTS 62-129129 6/1987 Japan .

*Primary Examiner*—Anthony McFarlane
*Attorney, Agent, or Firm*—Foley & Lardner

[57] ABSTRACT

A catalyst for the emission control of aldehyde comprises a coat layer of zirconium oxide formed on a monolithic substrate and can efficiently control the emission of aldehyde in an exhaust gas discharged from an internal engine using alcohol fuel.

10 Claims, No Drawings

CATALYSTS FOR EMISSION CONTROL OF ALDEHYDE

BACKGROUND OF THE INVENTION

1. Field of the Invention

This invention relates to a catalyst for the emission control of aldehyde which efficiently controls the emission of aldehyde as a harmful ingredient in an exhaust gas discharged from an internal engine for automobile or the like using alcohol or alcohol-containing fuel.

2. Description of the Related Art

Heretofore, there have been proposed various catalysts for the emission control of hydrocarbon (HC), carbon monoxide (CO) and nitrogen oxide (NOx) in the exhaust gas discharged from the internal engine. Among them, the use of noble metal such as platinum (Pt) or the like is possible to simultaneously remove out the above three ingredients. In case of using alcohol fuel, aldehydes are further produced through partial oxidation of alcohol in the internal engine, so that it is required to control the emission of aldehydes in the exhaust gas.

However, the conventional noble metal type catalysts possess both oxidative action of alcohol and oxidative action of aldehyde. Therefore, when the exhaust gas is purified by this catalyst, partial oxidation reaction of alcohol not combusted in the internal engine is caused to produce aldehyde, so that the exhaust gas passed through the catalyst still contains aldehyde and hence the conventional catalyst can not be applied to the emission control of aldehyde as it is. Even if it is intended to improve the performance of the three-way catalyst by increasing the amount of noble metal carried per the catalyst, the above problem can not fundamentally solved.

For the purpose of solving the problem, there are proposed catalysts in which silver (Ag) or the like is added to palladium (Pd) as a noble metal to remove aldehyde together with alcohol as disclosed in, for example, Japanese patent laid open No. 62-129129. In this case, it is attempted to improve the catalyst effect by the co-existing action of Pd and Ag.

However, the latter catalysts have problems as mentioned below:

(1) Since the noble metal and silver are fundamentally coexistent to remove aldehyde, the catalytic activity largely differs in accordance with the carrying way and dispersibility;

(2) The formation of aldehyde through partial oxidation of alcohol can not completely be controlled due to the use of the noble metal; and (3) Since the dispersibility of the active ingredient is important, there is a fear of degrading the catalyst effect during the use, and also there is the rebounding of other ingredient to the catalyst effect due to the alloying or the like.

SUMMARY OF THE INVENTION

The inventors have made various studies in order to solve the above problems and found that zirconium oxide is high in the oxidation activity of aldehyde and preferentially reacts with aldehyde as compared with the partial oxidation of methanol, and as a result the invention has been accomplished.

A catalyst for the emission control of aldehyde according to the invention is characterized in that (1) powder of zirconium oxide is included in a coat layer formed on a monolithic substrate, (2) this oxide powder is carried in an amount of 25-300 g per 1 l of substrate volume and (3) cerium oxide is not co-existent in the vicinity of the above oxide powder.

DESCRIPTION OF THE PREFERRED EMBODIMENTS

According to the invention, catalysts having a high aldehyde removing ability can be formed by applying and catalyzing zirconium oxide onto a monolithic substrate without using expensive noble metal such as platinum, palladium or the like. This is based on the inventors' knowledge that zirconium oxide can preferentially oxidize aldehyde in a gas containing alcohol and aldehyde to produce harmless $CO_2$ and water.

Further, it is necessary that zirconium oxide is not mixed with powder of cerium oxide and the like because cerium oxide is higher than zirconium oxide in the activity of partially oxidizing alcohol to produce aldehyde. Therefore, a catalyst having a high activity to aldehyde can be realized by separating zirconium oxide from cerium oxide or the like.

Moreover, the amount of zirconium oxide in the coat layer is 25-300 g per 1 l of substrate volume. When the amount of zirconium oxide is less than 25 g/l, the effect of improving the aldehyde removing ability is not recognized, while when it exceeds 300 g/l, the gas permeability of the catalyst is undesirably degraded and the addition effect is saturated. It is preferable that zirconium oxide is included in the coat layer at an amount of not less than 12.5 wt % and the coat layer is formed on the monolithic substrate at an average thickness of 50–200 μm.

The monolithic substrate is a ceramic carrier having many channels for gas and composed of cordierite or the like.

In case of the internal engine using methanol as a fuel, CO, $NO_x$, methanol and aldehyde are included in the exhaust gas as a harmful ingredient. The oxidation of methanol and the formation and oxidation of aldehyde proceed according to the following reaction formulae:

$$CH_3OH + \tfrac{1}{2}O_2 \rightarrow CH_2O + H_2O \tag{1}$$

$$CH_2O + O_2 \rightarrow H_2O + CO_2 \tag{2}$$

In the catalyst for the emission control of aldehyde, therefore, it is desirable that the reaction of the formula (2) is prior to the reaction of the formula (1). The conventional catalysts containing noble metal or the like as an active substance progress the reactions of the formulae (1) and (2) side by side, but the reaction of the formula (1) may rapidly be promoted according to the use condition of the catalyst to produce a great amount of aldehyde. This is due to the fact that alcohol and aldehyde are competitively adsorbed on the active site of the catalyst to promote the reaction, so that such a reaction can not be controlled by the catalyst itself. On the contrary, the catalyst for the emission control of aldehyde according to the invention contains zirconium oxide because zirconium oxide is considered to have a chemical state of adsorbing only aldehyde or preferentially causing the adsorption of aldehyde and the reaction of the formula (2) becomes considerably faster than the reaction of the formula (1). That is, in the catalyst according to the invention, the oxidation of aldehyde is preferentially attained as compared with the oxidation of methanol or the selective oxidation of aldehyde is conducted, so that the catalyst according to the invention is excellent in the removal of aldehyde.

As mentioned above, the catalyst according to the invention alone can efficiently control the emission of aldehyde in the exhaust gas discharged from the internal engine using alcohol or alcohol-containing fuel. Further, when the catalyst according to the invention is arranged at a downstream side of a three-way catalyst using a noble metal in series, the remaining aldehyde not controlled by the three-way catalyst or aldehyde produced in the catalyst can exclusively be controlled by the catalyst according to the invention. In the latter case, HC, CO and NOx can be controlled at an upstream side of the passage for exhaust gas produced from alcohol fuel and aldehyde can be controlled at a downstream side thereof.

Moreover, the three-way catalyst used at the upstream side is preferable to be a catalyst carrying platinum/rhodium (Rh), palladium/rhodium or only palladium.

The following examples are given in illustration of the invention and are not intended as limitations thereof.

Example 1

Into a porcelain ball mill are charged 112.5 g of commercially available zirconium oxide powder, 787.5 g of activated alumina powder and 900 g of aqueous nitric acid solution, which are mixed with stirring to obtain a slurry. After the slurry is immersed in a cordierite monolithic substrate, an excessive amount of the slurry is removed from cells of the substrate through an air stream and then the slurry adhered to the substrate is dried and fired at 400° C. for 1 hour to obtain a catalyst (a) having a coat layer weight of 200 g/1 l of the substrate (amount of zirconium oxide: 25 g/l).

Example 2

A catalyst (b) (amount of zirconium oxide: 100 g/l) is obtained in the same manner as in Example 1 except that 450 g of zirconium oxide powder and 450 g of alumina powder are used.

Example 3

A catalyst (c) (amount of zirconium oxide: 200 g/l) is obtained in the same manner as in Example 1 except that 900 g of zirconium oxide powder and 900 g of aqueous nitric acid solution are used.

Example 4

Activated alumina powder is impregnated with an aqueous solution of zirconium nitrate, which is dried and fired in air at 600° C. for 1 hour to obtain a zirconia-containing activated alumina powder containing 8% by weight of zirconium as a metal based on alumina.

Into a porcelain ball mill are charged 900 g of zirconia-containing activated alumina powder and 900 g of aqueous nitric acid solution, which are mixed with stirring to obtain a slurry.

After the slurry is immersed in cordierite monolithic substrate and an excessive amount of the slurry is removed from cells of the substrate through air stream, the slurry is dried and fired at 400° C. for 1 hour to obtain a catalyst (d) having a coat layer weight of 250 g/1 l of substrate (amount of zirconium oxide: 25 g/l).

Comparative Example 1

A catalyst (e) is obtained in the same manner as in Example 1 except that zirconium oxide powder is omitted and the slurry is prepared only by using alumina powder.

Comparative Example 2

A catalyst (f) is obtained in the same manner as in Example 1 except that cerium oxide is used instead of zirconium oxide powder.

Comparative Example 3

A catalyst (g) is obtained in the same manner as in Example 2 except that cerium oxide is used instead of alumina powder.

Comparative Example 4

Into a porcelain ball mill are charged 900 g of activated alumina powder carrying Pt and 900 g of alumina sol in nitric acid, which are mixed with stirring to obtain a slurry.

After the slurry is immersed in cordierite monolithic substrate and an excessive amount of the slurry is removed from cells of the substrate through air stream, the slurry is dried and fired at 400° C. for hour to obtain a catalyst (h) having a coat layer weight of 200 g/1 l of substrate. The amount of noble metal adhered is 1.18 g/l.

Test Example 1

Each of the catalysts in Examples 1–4 and Comparative Examples 1–4 (catalysts a–h) is subjected to an endurance treatment in air under the following conditions and then subjected to a performance evaluating teat under the following conditions to measure conversion efficiencies of aldehyde and methanol in the catalyst.

The results are shown in Table 1.

Endurance conditions

Heating temperature: 1000° C.

Heating time: 4 hours

Evaluation conditions

Catalyst volume: 1.7 l

Displacement of engine: 1800 cc

Fuel: high-concentration methanol M85

Air excess ratio: 0.9

Test method: After the room temperature is set to 25° C. and the outside of the catalyst is 25° C. without passing gas, an engine is started to raise a temperature of an exhaust gas and then the exhaust gas is continuously analyzed before and after the catalyst to measure an average conversion efficiency while raising the temperature for 600 seconds. The final temperature of the exhaust gas is 400°–500° C.

| Harmful ingredients in exhaust gas: | |
| --- | --- |
| HC | 1200 ppm |
| CO | 0.5 volume % |
| NO | 850 ppm |
| Aldehyde | 80 ppm |

TABLE 1

| Catalyst | Content of ingredient (g/l) | | | | Average conversion efficiency (%) | | Remarks |
| --- | --- | --- | --- | --- | --- | --- | --- |
| | ZrO₂ | CeO₂ | Pt | Al₂O₃ | aldehyde | methanol | |
| (a) | 25  | 0   | 0    | 175    | 40  | 5  | Example 1 |
| (b) | 100 | 0   | 0    | 100    | 50  | 5  | Example 2 |
| (c) | 200 | 0   | 0    | 0      | 95  | 2  | Example 3 |
| (d) | 25  | 0   | 0    | 225    | 50  | 5  | Example 4 |
| (e) | 0   | 0   | 0    | 175    | −5  | 25 | Comparative Example 1 |
| (f) | 0   | 25  | 0    | 175    | −90 | 25 | Comparative Example 2 |
| (g) | 100 | 100 | 0    | 0      | 5   | 30 | Comparative Example 3 |
| (h) | 0   | 0   | 1.18 | 198.82 | 40  | 40 | Comparative Example 4 |

Example 5

An exhaust gas emission control device (A) is prepared by arranging 1.7 l of a three-way catalyst of Pt/Rh=5/1 containing an amount of Pt+Rh/substrate volume=1.41 g/l (40 g/cf) as an exhaust gas emission control catalyst for alcohol fuel at an upstream side of a passage for the exhaust gas and 1.7 l of an aldehyde emission control catalyst at a downstream side thereof in series.

As the aldehyde emission control catalyst is used the same catalyst as in Example 1 in which the amount of zirconium oxide is 200 g per 1 l of substrate volume.

Example 6

An exhaust gas emission control device (B) is prepared in the same manner as in Example 5 except that a three-way catalyst of Pd/Rh=8/1 containing an amount of Pd+Rh/substrate=21.2 g/l (60 g/cf) is used instead of the Pt/Rh catalyst.

Example 7

An exhaust gas emission control device (C) is prepared in the same manner as in Example 5 except that a Pd catalyst containing a Pd amount of 3.23 g/l (120 g/cf) is used instead of the Pt/Rh catalyst.

Comparative Example 5

An exhaust gas emission control device (D) is prepared in the same manner as in Example 5 except that a substrate coated with only alumina is used instead of the aldehyde emission control catalyst.

Comparative Example 6

An exhaust gas emission control device (E) is prepared in the same manner as in Example 5 except that a three-way catalyst of Pt/Rh is arranged at the downstream side instead of the aldehyde emission control catalyst.

Test Example 2

Each of the exhaust gas emission control devices in Examples 5–7 and Comparative Examples 5–6 is arranged in a system shown in Table 2 and the performance thereof is evaluated to obtain results as shown in Table 3.

TABLE 2

| | |
| --- | --- |
| Type of engine | water-cooled 4 cylinders |
| Displacement (cc) | 1809 |
| Fuel feeding system | electron-controlled fuel injection through suction valve |
| Fuel | high concentration methanol M85 |
| Position of catalyst mounted | beneath floor |

TABLE 3

| Exhaust emission control device | LA4 mode emission (g/mile) | | | Aldehyde (mg/mile) | Remarks |
| --- | --- | --- | --- | --- | --- |
| | HC | CO | NOₓ | | |
| (A) | 0.1  | 0.5  | 0.16 | 8  | Example 5 |
| (B) | 0.09 | 0.4  | 0.20 | 10 | Example 6 |
| (C) | 0.08 | 0.4  | 0.22 | 10 | Example 7 |
| (D) | 0.11 | 0.5  | 0.16 | 30 | Comparative Example 5 |
| (E) | 0.07 | 0.35 | 0.10 | 35 | Comparative Example 6 |

| Harmful ingredients in exhaust gas | |
| --- | --- |
| HC       | 1200 ppm |
| CO       | 0.5 volume % |
| NO       | 850 ppm |
| aldehyde | 80 ppm |

As mentioned above, the catalyst for the emission control of aldehyde according to the invention comprises a monolithic substrate and a coat layer formed thereon and containing 25–300 g of zirconium oxide powder per 1 l of the substrate without co-existing with cerium oxide, so that it can efficiently control the emission of aldehyde as a harmful ingredient in an exhaust gas discharged from an internal engine using alcohol or alcohol-containing fuel. Furthermore, when the three-way catalyst using noble metal is arranged at an upstream side of the exhaust gas emission control device and the catalyst for the emission control of aldehyde is arranged at a downstream side thereof, the emission of the exhaust gas can be controlled corresponding to alcohol fuel without largely increasing the amount of expensive noble metal used which has a problem in resource.

What is claimed is:

1. A catalyst for the emission control of aldehyde, which comprises a monolithic substrate and a catalytic coating layer formed thereon, wherein said coating layer contains 25–300 g of zirconium oxide and 0–225 g of aluminum oxide per 1 liter of substrate volume.

2. A catalyst as claimed in claim 1, wherein said catalytic coating layer contains 100–200 g of zirconium oxide per 1 liter of substrate volume.

3. A catalyst as claimed in claim 2, wherein said catalytic coating layer contains 200 g of zirconium oxide per 1 liter of substrate volume.

4. A catalyst as claimed in claim 1, wherein said catalytic coating layer contains 100-225 g of aluminum oxide per 1 liter of substrate volume.

5. A catalyst as claimed in claim 4, wherein said catalytic coating layer contains 175 g of aluminum oxide per 1 liter of substrate volume.

6. A catalyst as claimed in claim 1, wherein said catalytic coating contains no cerium oxide.

7. A catalyst for the emission control of aldehydes, which comprises a monolithic substrate and a catalytic coating layer formed thereon, wherein said coating layer contains 25-300 g of zirconium oxide and 0-225 g of aluminum oxide per 1 liter of substrate volume, and wherein said catalyst contains no noble metals.

8. A catalyst as claimed in claim 7, wherein said catalytic coating contains no cerium oxide.

9. A catalyst for the emission control of hydrocarbons, nitrogen oxides, carbon monoxide and aldehydes, said catalyst comprising a monolithic substrate, wherein said monolithic substrate is divided into at least a first and second zone, said first zone contains a noble metal thereon for the emission control of said hydrocarbons, nitrogen oxides and carbon monoxide, said second zone is disposed downstream of said first zone in the direction of emissions flow through said substrate, and wherein said second zone has a catalytic coating layer formed thereon, said coating layer contains 25-300 g of zirconium oxide and 0-225 g of aluminum oxide per 1 liter of substrate volume, and wherein said second zone contains no noble metals.

10. A catalytic coating as claimed in claim 9, wherein said catalytic coating contains no cerium oxide.

* * * * *